UNITED STATES PATENT OFFICE.

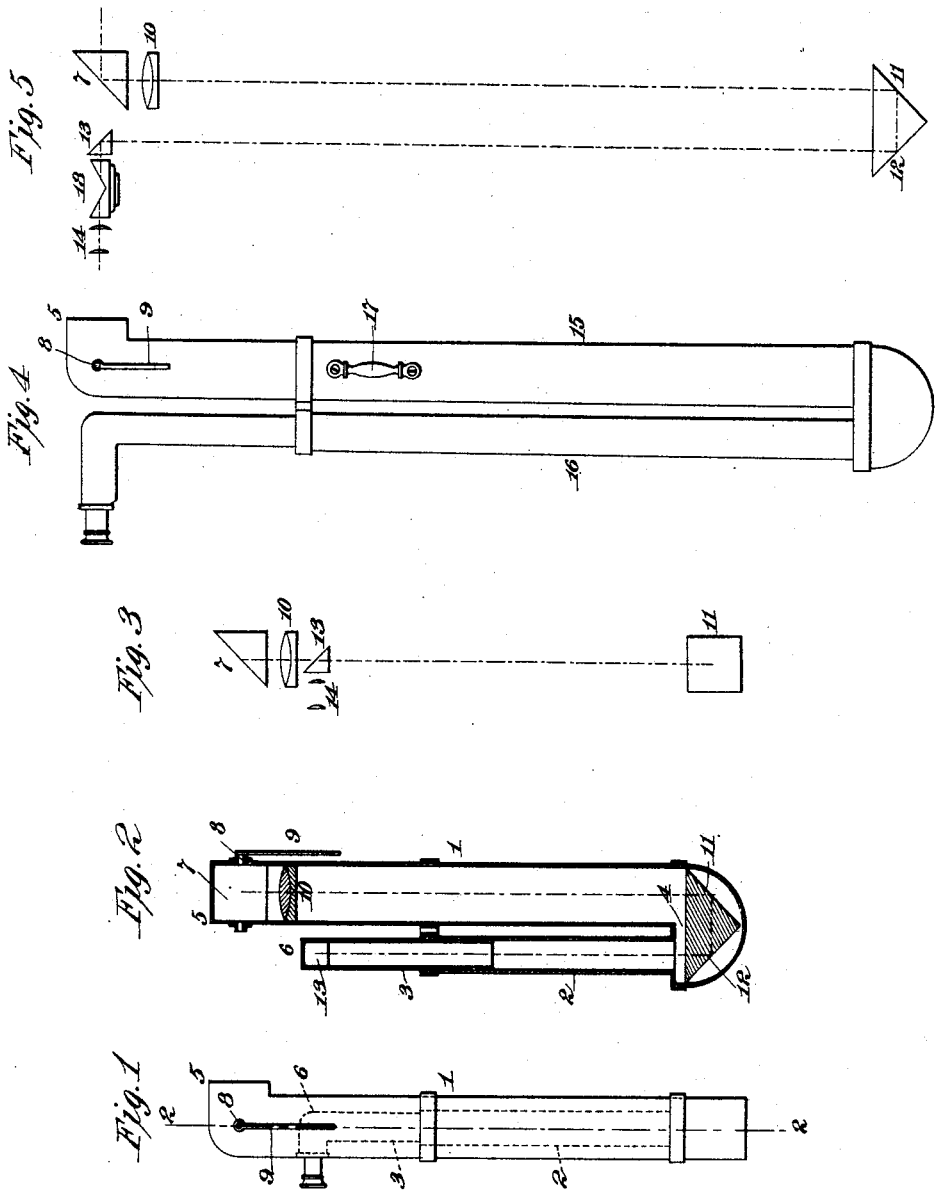

BRADLEY A. FISKE, OF NEW YORK, N. Y.

TELESCOPE.

SPECIFICATION forming part of Letters Patent No. 674,576, dated May 21, 1901.

Application filed May 5, 1900. Serial No. 15,563. (No model.)

*To all whom it may concern:*

Be it known that I, BRADLEY A. FISKE, a citizen of the United States, residing in the borough of Manhattan, city, county, and State of New York, have invented certain new and useful Improvements in Telescopes, of which the following is a specification.

My invention relates to improvements in telescopes adapted particularly for marine use. At the present time it is difficult to properly manipulate the usual telescopes on shipboard, and particularly during rough weather, with the usual accompaniment of high winds, since the center of gravity of the instrument requires to be sustained a considerable distance from the observer, making it, therefore, obviously extremely difficult to maintain the instrument trained on a definite object. Under any circumstances, except when independently supported, a telescope is a difficult instrument to use effectively, but under the conditions which exist on shipboard the difficulties are very greatly increased.

My improved telescope is particularly adapted for use on shipboard for the reason that it is of such a form that its center of gravity is maintained very close to the observer, and the instrument can therefore be held much more steadily than the ordinary devices.

In my improved telescope I employ a revoluble reflecting-surface which can be operated almost intuitively by the observer for maintaining the observed object in view, making it, therefore, only necessary for the observer to hold the instrument directed in the general direction of the object to be observed and maintaining such object in the field of vision by the manipulation of the reflecting-surface, thereby doing away with the necessity of moving the entire instrument, as is now the case, to maintain the object in the field of vision when used on an unstable platform, as a rolling ship, or when the object moves above or below the horizontal line from the telescope.

The object of my invention, therefore, is to provide an improved telescope which is compact and which will be always held close to the body of the observer for the reasons explained.

In carrying my invention into effect I employ either a single tube, extending at right angles to the line of sight, or a pair of tubes connected together at one end, either side by side or front to back and extending parallel to each other and equipped with necessary lenses, reflecting-surfaces, and eyepiece, so as to permit the light entering at one end of the tube to be properly caused to travel through the tube or tubes by the reflecting-surfaces, through the eyepiece, which is mounted at the upper end of the instrument, suitable provision being made for the proper focusing of the instrument and for the manipulation of one of the reflecting-surfaces to maintain the observed object in the field of view, all as will be more fully hereinafter described and claimed.

In order that the invention may be better understood, attention is directed to the accompanying drawings, forming a part of this specification, and in which—

Figure 1 represents a side elevation of my improved telescope in its preferred form; Fig. 2, a section on the line 2 2 of Fig. 1, showing the preferred arrangement of lenses and reflecting-surfaces for use with this form of the device; Fig. 3, a diagram taken at right angles to Fig. 2, showing the same arrangement of lenses and reflecting-surfaces; Fig. 4, a side elevation of a modified arrangement of double-tube instrument, the tubes being arranged front to back; and Fig. 5, a diagram of the lenses and reflecting-surfaces which I prefer to use with the arrangement of device shown in Fig. 4.

In all of the above views corresponding parts are represented by the same numerals of reference.

Referring to Figs. 1, 2, and 3, 1 represents a main tube or body, which is made preferably cylindrical, of the desired length, and of any suitable material, such as sheet-brass, suitably blackened on its interior. 2 is a smaller and shorter tube, having a telescope portion 3 and extending substantially parallel to the tube 1 and at the side thereof, as shown. The interiors of the tubes 1 and 2 are connected together by a passage 4, as shown in Fig. 2. The tube 1 is provided at its upper end with an elbow 5, and the tube 3 is provided at its upper end with an elbow 6, the parts being so constructed as to bring the elbow 6, which contains the eye-lenses, at about the level of the observer's eye when the instrument is carried naturally in the left hand of the observer, close to the body. Any suitable arrangement of lenses and reflecting-surfaces can be adopted, that shown in Figs. 2 and 3 being preferable. 7 represents a reflecting-surface which is placed at the angle of the elbow 5 and the upper end of the tube 1, so that rays of light entering through the end of the elbow 5 will be reflected vertically downward within said tube. The reflecting-surface 7 may be of any suitable character—as a mirror, for example; but I prefer to employ a prism for this purpose, as shown, said prism being carried on a horizontal pivot 8, which may be provided on the outside with a lever 9, by which the angle of the reflecting-surface may be changed. Instead of using a lever for the manipulation of the reflecting-surface 7 any other form of adjusting device can be used, as will be obvious. Below the reflecting-surface 7 I mount a usual object-glass 10, through which the rays of light deflected by the surface 7 are caused to pass. At the bottom of the tube 1 I employ a second reflecting-surface 11 for reflecting the rays of light horizontally through the opening 4 into the tube 2, and at the bottom of the tube 2 I employ a third reflecting-surface 12, reflecting the rays vertically upward within said tube. Preferably the reflecting-surfaces 11 and 12 are provided by a single prism, as shown. At the top of the tube 3, in line with the elbow 6, I employ a fourth reflecting-surface 13, which also is preferably in the form of a prism and by which the rays of light will be reflected horizontally out through the suitable eye-lens 14 14 in said elbow. It will be observed that rays of light will therefore strike the surface 7, be deflected downward through the object-glass 10 to the surface 11, thence to the surface 12, up through the tube 2 to the surface 13, and out through the eye-lenses 14 14, whereby the desired optical effect will be secured, the arrangement of the reflecting-surfaces being such as to properly reinvert the image inverted by the object-glass 10, as will be understood. The proper focusing of the device is effected by adjusting the tube 3 within the tube 2 in the usual way.

In using my improved telescope the instrument is sustained by the left hand of the observer in a vertical position close to the body, the position being that which would naturally be assumed if an effort were made to hold any object firmly on an unstable platform. The object to be observed is brought into the field of view by directing the elbow 5 in its general direction and is maintained in the proper field by adjusting the position of the reflecting-surface 7 as the changing position of the observer with respect to that object may require.

Referring to Figs. 4 and 5, a somewhat similar arrangement is used, except that the tube 15, which is connected at its lower end to the bottom of a smaller sectional or telescopic tube 16, is arranged in front thereof instead of at its side. With this modification the tubes 15 and 16 are shown as being long enough to enable the instrument to be supported on the deck or other platform directly in front of the observer, the tube 15 being provided with a handle 17, by which the device may be properly manipulated. Since the tubes 15 and 16 are placed front to back the system of reflecting-surfaces and lenses requires only to be so placed as to reflect the image in a single plane, and consequently the same arrangement of these elements can be employed as in Fig. 3, except as shown in Fig. 5. The deflecting-surfaces 11 and 12 are placed parallel with the primary light-rays instead of at right angles thereto. In this arrangement I illustrate an erecting-prism 18, interposed between the reflecting-surface 13 and the eye-lenses 14, for the purpose of reinverting the image. Any well known optical equivalent for an erecting-prism can be employed for this purpose.

Having now described my invention, what I claim as new, and desire to cover by Letters Patent, is as follows:

1. An improved self-contained, portable telescope or analogous optical device comprising a pair of connected parallel tubes, connected at their lower ends and communicating with each other at their lower ends, a reflector carried by one of said tubes near its upper end for receiving approximately horizontal light-rays and deflecting them downward within said tube, an eyepiece connected to the corresponding end of the other tube, an objective, means for causing the light-rays deflected by the reflector to enter the eyepiece, whereby the instrument will be maintained in a vertical position in observing a horizontal field, and means for manually adjusting the inclination of the reflector, substantially as set forth.

2. An improved self-contained, portable telescope or similar optical device comprising a pair of parallel tubes connected together near their lower ends and communicating directly with each other, a reflector near the upper end of one of said tubes for receiving approximately horizontal light-rays and deflecting them downward, reflectors at the bottom of each tube for deflecting said light-rays from the first tube to the second tube, and up through the second tube, an eye-lens carried by the second tube through which the said deflected rays pass, and means for manually adjusting the inclination of the first-mentioned reflector, substantially as set forth.

3. An improved self-contained, portable telescope comprising a pair of parallel tubes connected together near their lower ends and communicating with each other, one of said tubes being made of telescoping sections, a prism at the lower end of both tubes, a prism near the upper end of the first tube for receiving approximately horizontal light-rays and deflecting them downward, a prism near the upper end of the second tube, an eyepiece carrying eye-lenses at the upper end of the second tube, and means for manually adjusting the inclination of the prism at the upper end of the first tube, substantially as set forth.

4. An improved self-contained, portable telescope comprising a pair of parallel tubes arranged side by side and connected directly together at their lower ends, an eyepiece at the free end of one tube, an opening at the corresponding end of the other tube, a system of reflectors and lenses for causing light-rays entering said opening to pass in two planes through the tubes to the eyepiece, and means for adjusting the inclination of one of said reflectors, substantially as set forth.

5. An improved self-contained, portable telescope comprising a pair of parallel tubes arranged side by side, connected directly together at their lower ends, and with connecting-bores, an opening in the upper end of the first tube an eyepiece at the upper end of the second tube, a reflector at the upper end of the first tube, a reflector at the upper end of the second tube, eye-lenses in said eyepiece, a prism at the bottom of both tubes, an object-glass, and means for manually adjusting the inclination of the reflector at the top of the first tube, substantially as set forth.

6. An improved self-contained portable telescope, comprising an inclosing body, an opening in the same near the upper end thereof in which the rays of light from objects in an approximately horizontal plane may enter, a reflector behind said opening for reflecting the rays downwardly, a lens or object-glass adjacent to said reflector and through which the rays pass, a second reflector at the bottom of the inclosing body for reflecting the downward rays in an approximately horizontal direction and in a vertical plane which is at right angles to the line of sight, a third reflector closely adjacent to the second reflector for reflecting the rays upwardly, a fourth reflector near the top of the inclosing body for reflecting the rays approximately horizontally and in a vertical plane which is parallel to the line of sight, and an eyepiece for receiving the horizontally-reflected rays, substantially as and for the purposes set forth.

This specification signed and witnessed this 1st day of May, 1900.

BRADLEY A. FISKE.

Witnesses:
   Jno. R. Taylor,
   Archibald G. Reese.